United States Patent [19]

Sakaguchi et al.

[11] 4,408,831
[45] Oct. 11, 1983

[54] OPTICAL SWITCH

[75] Inventors: Haruo Sakaguchi; Norio Seki, both of Tokyo; Shu Yamamoto, Chofu; Hiroharu Wakabayashi, Kawasaki, all of Japan

[73] Assignee: Kokusai Denshin Denwa Co., Ltd., Tokyo, Japan

[21] Appl. No.: 295,311

[22] Filed: Aug. 24, 1981

[30] Foreign Application Priority Data

Sep. 5, 1980 [JP] Japan ................. 55-122270

[51] Int. Cl.³ .................................. G05D 25/00
[52] U.S. Cl. ...................... 350/269; 350/266
[58] Field of Search ............ 350/269, 270, 266, 484, 350/486, 526, 96.2, 169–174

[56] References Cited

U.S. PATENT DOCUMENTS 3,798,435  3/1974  Schindl .................. 350/526

FOREIGN PATENT DOCUMENTS 54-122134  9/1979  Japan ................. 350/96.1 S

Primary Examiner—Jon W. Henry
Attorney, Agent, or Firm—Armstrong, Nikaido, Marmelstein & Kubovcik

[57] ABSTRACT

An optical switch for switching laser beams, having a transparent glass plate with a reflection film on the surface of the same has been found. When the reflection film is at the first position, the first input beam is coupled with the output beam through the transparent glass plate, while the second input beam is prevented by said reflection film. When the reflection film is at the second position, the first input beam is prevented by said reflection film, and the second input beam is coupled with the output beam through the reflection by said reflection film. Thus, according to the displacement of the transparent glass plate together with the reflection film, the input beams are switched. Due to the above operational principle, the output optical level does not decrease even during the transient time, and then, the present optical switch is utilized in an optical repeater for digital communication.

7 Claims, 31 Drawing Figures

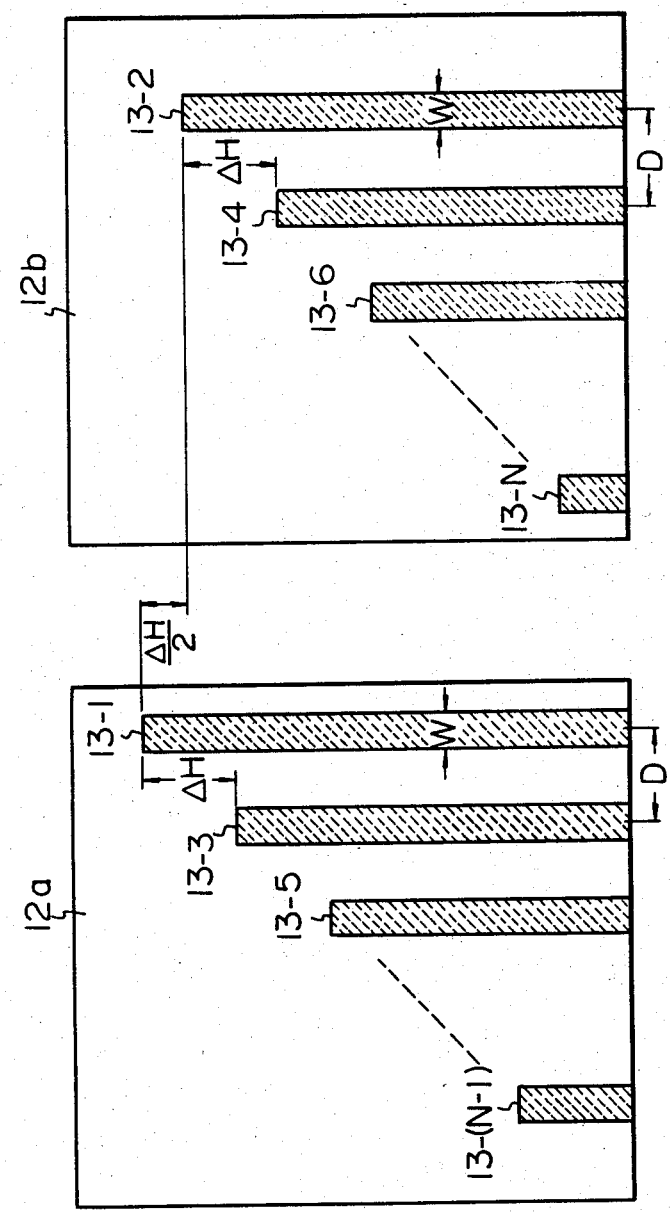

OPTICAL SWITCH

BACKGROUND OF THE INVENTION

The present invention relates to an optical switch, in particular, relates to such a switch for switching sequentially a plurality of optical paths in an optical communication system.

Generally, in a communication system, when the reliability of a system is not sufficient, a redundant standby component is provided for the component which has the lowest level of reliability, and when the normal component becomes unavailable, that component is switched to the standby component. In particular, in an optical communication system utilizing an optical fiber cable, lasers and semiconductor photodetectors, the reliability of those elements is unknown, and then, the standby components for those components are installed. In switching the components, it is important that the switching does not affect the transmission performance, and that the switching element itself has a high enough level of reliability.

Now, the switching operation of a semiconductor laser will be analyzed below. When the degradation of the normal semiconductor laser is recognized, the standby semiconductor laser is switched ON. It should be noted that a semiconductor lasers does not provide the perfect optical waveform initially, although the optical waveform is completed in a short time. When the output optical waveform is not complete, that output waveform must not be coupled with the communication line. When the standby laser provides the complete output optical waveform, the output of the laser is switched from the normal laser to the standby laser, and then, the normal laser becomes a standby laser, and the standby laser becomes a normal laser. Then, when the switching between the two lasers is finished, the first normal laser which is now the standby laser is switched OFF. In the above switching operation, an optical switch must provide the isolation between a normal laser and a standby laser in order to prevent the undesirable interference between the two lasers. Of course, the insertion loss of an optical switch must be as small as possible.

A prior optical switch is shown in FIGS. 1A, 1B and 1C, in which a pair of optical fibers confront each other, and the optical fiber 3 at the reception side displaces the position, and then, the switching operation is performed. That is to say, as shown in FIGS. 1A and 1B, the reception side optical fiber 3 confronts with either the optical fiber 1 or the optical fiber 2, and the switching operation between the optical fibers 1 and 2 is performed. However, it should be appreciated as shown in FIG. 1C that there is a transient position that the reception optical fiber 3 locates at the intermediate position between the input optical fibers 1 and 2. In that transient position, the reception optical fiber 3 might not couple with the optical fibers 1 and 2, or even if the reception optical fiber 3 couples with the optical fibers 1 and 2, the combined optical energy transmitted to the reception optical fiber 3 from the optical fibers 1 and/or 2 might be reduced during the switching transient duration.

FIGS. 2A through 2C show another prior optical switch, in which a switching operation is accomplished through the displacement of a prism. In FIG. 2A, the input beam 9 at the input port 5 is reflected twice by the prism 8 which is installed in the housing 4, and then, said input beam 9 appears at the output port 7 as the output beam 11. On the other hand, another beam 10 at another input port 6 does not appear at the output port 7. On the other hand, when the prism 8 displaces to the position shown in FIG. 2B, the input beam 10 at the input port 6 is directly coupled with the output port 7, but the input beam 9 at the input port 5 does not appear at the output port 7. Therefore, the displacement of the prism 8 provides the switching operation of the optical beams.

In analyzing the switching operation of the optical switch of FIGS. 2A and 2B, it should be noted that there is a transient position of the prism 8 that both the input beams 9 and 10 pass the prism 8. That is to say, as shown in FIG. 2C, when the input beam passes the vertical angle 8-$a$ of the prism 8, the other input beam 10 might pass the other vertical angle 8-$b$ of the prism 8. In that occasion, due to the incompleteness of the vertical angles 8-$a$ and 8-$b$ of the prism 8, the combined beam 11 by the input beams 9 and 10 is attenuated a little. Therefore, the output optical beam 11 is attenuated in a short time during the switching transient duration.

As described above, a prior optical switch has the disadvantage that the level of the output beam is attenuated in the switching transient duration. In that transient duration, the S/N (signal to noise ratio) is lowered at the succeeding optical repeater, and thus, the communication quality is deteriorated. It should be noted that said low level in the transient duration can not be compensated by the operation of an AGC (automatic gain control), because the response time of an AGC system is slower than the transient time of an optical switch.

FIG. 3 shows the curves the bit error rate at the succeeding optical repeater due to the reduction of the optical level in the switching transient. In FIG. 3, the vertical axis shows the bit error rate, and the horizontal axis shows the amount of the decrease of the optical level in the switching transient in dB. In FIG. 3, the mark ratio of the transmission pulse train is 1/2, the transmission speed is 280 Mb/second, the waveform is rectangular with the duty ratio 50%, the ON/OFF ratio of a laser is 10 dB, the wavelength is 1.3 $\mu$n, the receiving photodetector is GeAPD, utilizing the FCRO equalizer, and the thermal noise is 6 pA/$\sqrt{Hz}$. The S/N margin in FIG. 3 shows the margin of the S/N allowed for the succeeding optical repeater which has not switched a laser yet, and said S/N margin shows the amount to the reference S/N (in the embodiment, the reference S/N is 22.55 dB which corresponds to the error rate $10^{-11}$). In FIG. 3 it should be noted that when the decrease of the error rate due to the optical switching must be less than $10^{-7}$, and when the S/N margin is 3 dB, the decrease of the optical power during the transient duration of the switching must be less than 1.6 dB. However, a prior optical switch can not satisfy that condition.

SUMMARY OF THE INVENTION

It is an object, therefore, of the present invention to overcome the disadvantages and limitations of a prior optical switch by providing a new and improved optical switch.

It is also an object of the present invention to provide an optical switch which does not suffer from the decrease of the output level during the switching transient.

The above and other objects are attained by an optical switch comprising a transparent plate having a pair of parallel planes; a reflection film attached on at least one of said parallel planes; a first input means for providing a first input beam to a first plane of said transparent plate; a second input means for providing a second input optical beam to the first plane of said transparent plate through a second plane of said transparent plate; output means for providing output beam by receiving one of input beams through said transparent plate; said input beams and output beam residing in the plane perpendicular to the transparent plate; said second input means being provided so that the angle between the first and the second input beams is 90 degrees, and the second input beam illuminates the same spot of the first plane as the first input beam does; said output means being provided so that the first input beam is coupled with the output means through the transparent plate, and the second input beam is coupled with the output means through the reflection by the reflection film; and means for displacing said transparent plate together with the reflection film in the plane defined by said transparent plate.

BRIEF DESCRIPTION OF THE DRAWINGS

The foregoing and other objects, features, and attendant advantages of the present invention will be appreciated as the same become better understood by means of the following description and accompanying drawings wherein;

FIGS. 8A, 8B, 8C and 8D show still another embodiment of the optical switch according to the present invention.

DESCRIPTION OF THE PREFERRED EMBODIMENTS

Figures 1A, 1B, 1C:
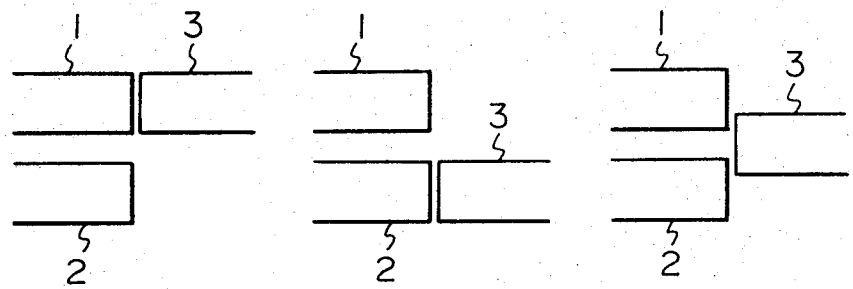
FIGS. 1A, 1B and 1C show a prior optical switch.
Figure 2A:
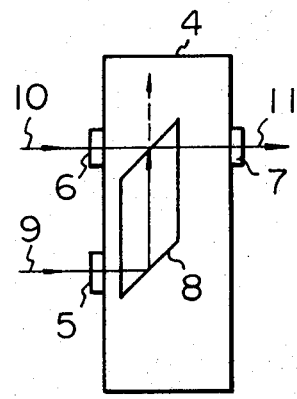
FIGS. 2A, 2B and 2C show another prior optical switch.
Figure 2B:
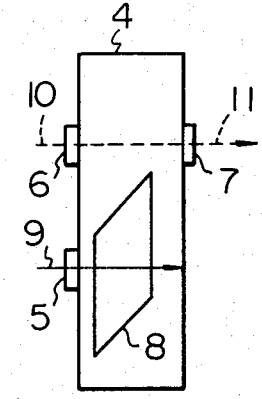
Figure 2C:
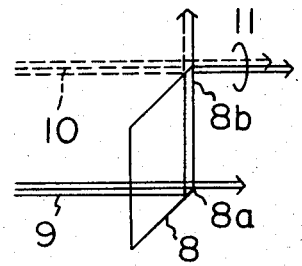
Figure 3:
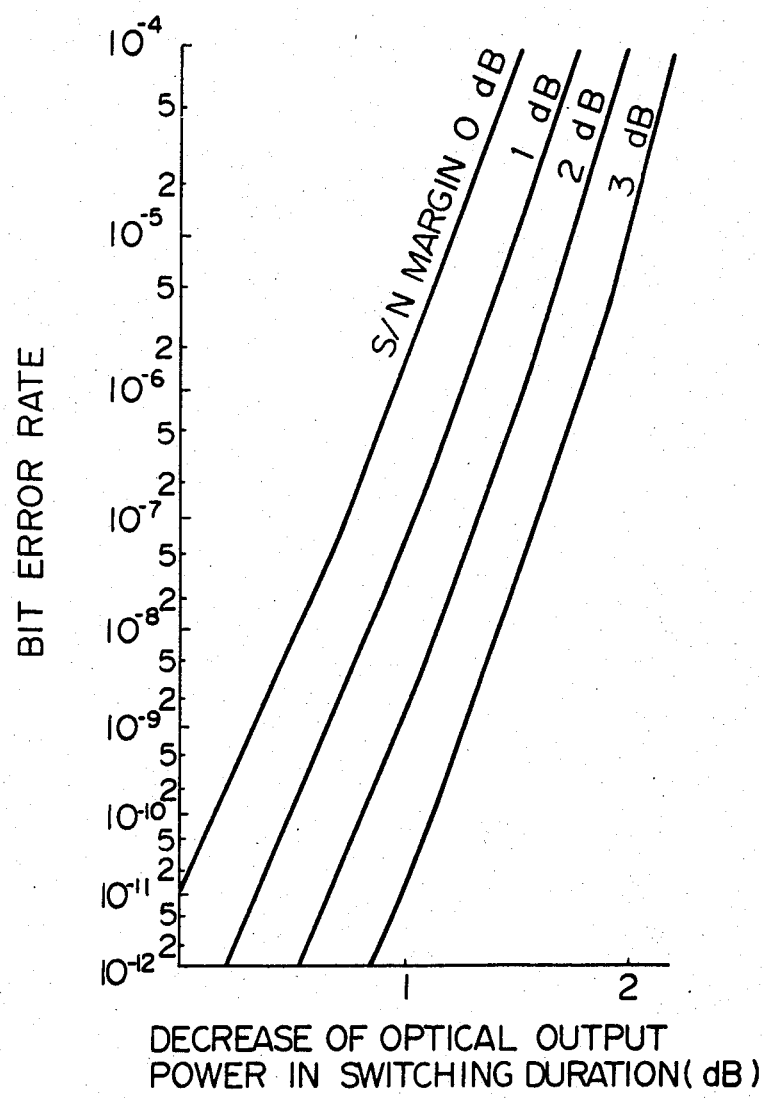
FIG. 3 shows the curves showing the increase of the error rate due to the decrease of the optical power during the switching transient.
Figure 4A:
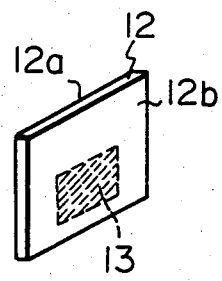
FIGS. 4A, 4B, 4C and 4D show the first embodiment of the optical switch according to the present invention.

FIGS. 4A through 4D show the embodiment of the optical switch according to the present invention. In FIG. 4A, there is provided a transparent glass plate 12, the both surfaces 12-a and 12-b of which are coated with a thin film for non-reflection purpose. The thin reflection film 13 which is made of the material having the high reflection coefficient like silver is attached on one surface 12-a.

Figure 4B:
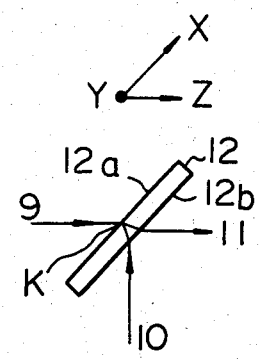

FIG. 4B shows the arrangement of said glass plate 12, the input beams 9 and 10, and the output beam 11. The input beams 9 and 10 are located in the plane which is perpendicular to the glass plate 12, and said input beams 9 and 10 are incident on the glass plate 12 in the direction that the angle of those beams and the glass plate 12 is 45 degrees. Further, the input point K of the beam 9 on the reflection film 13 on the surface 12-a is supposed to coincide with the reflection point of the other beam 10 on the surface 12-a.

Figure 4C:
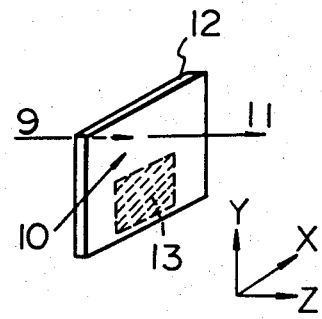

In the status of FIG. 4C, the input beam passes the transparent portion of the glass plate 12, and provides the output beam 11, while the other input beam 10 just passes the glass plate 12 but does not provide the output beam 11.

Figure 4D:
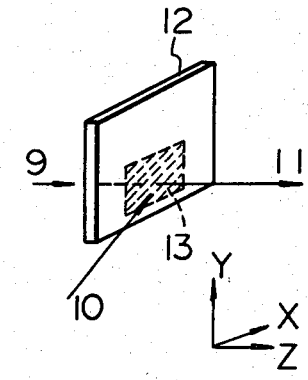
Figure 4:
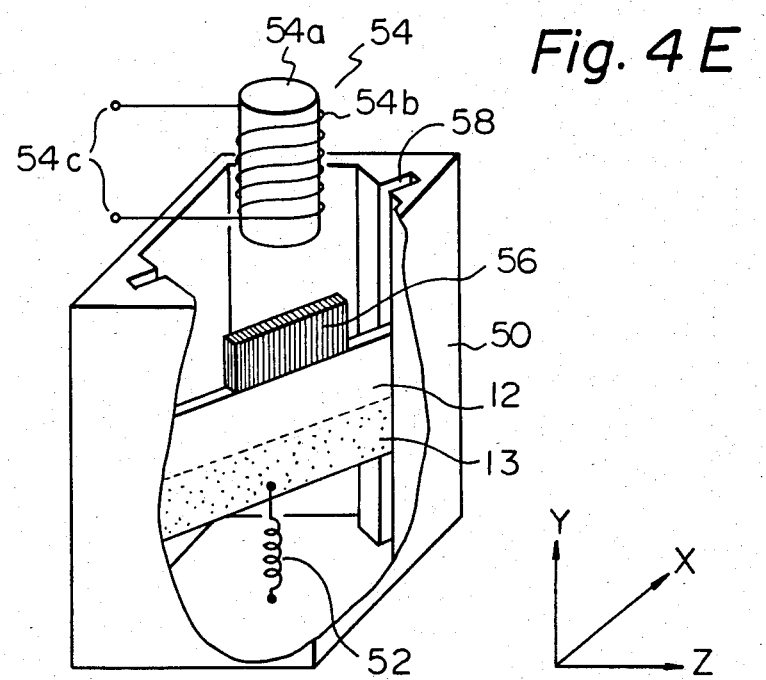
FIG. 4E and FIG. 4F show the mechanical structure of the optical switch of FIGS. 4A through 4D.
Figure 4:
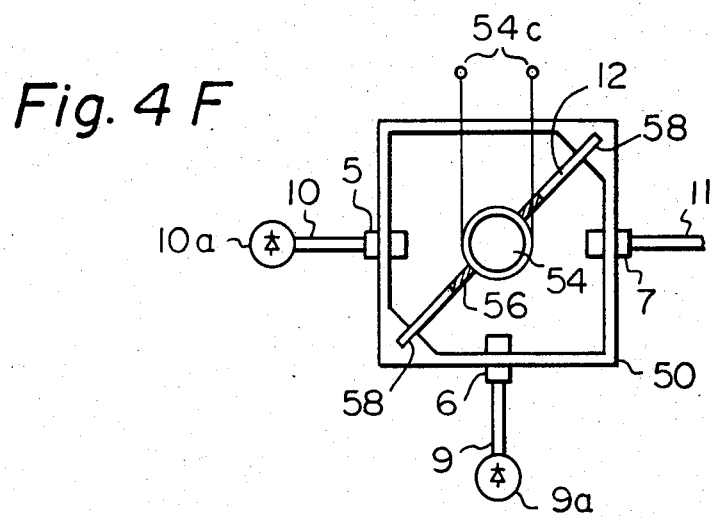

On the other hand, in the status of FIG. 4D where the glass plate 12 displaces in the direction Y, which is parallel to the glass plate plane 12 and is perpendicular to the plane defined by the input beams 9 and 10, the input beam 9 is reflected by the reflection film 13 and does not provide the output beam 11, and the other input beam 10 provides the output beam 11 through the reflection by the film 13. Thus, the optical switching from either the input beams 9 or 10 to the output beam 11 is performed.

FIGS. 4E and 4F show the mechanical structure of the present optical switch described in accordance with FIGS. 4A through 4D. In those figures, FIG. 4E is the partially fragmentary perspective view, and FIG. 4E is the plane cross section. In those figures, the reference numeral 50 is a housing, 52 is a coil spring one end of which is fixed to the bottom of the housing 50, and the other end of which is fixed to the glass plate 12. The reference numeral 54 is an electro-magnet having a ferro-magnetic core 54a, a coil 54b wound around the core 54a, and the terminals 54c of the coil 54b. Said electro-magnet 54 is fixed to the housing 50. The reference numeral 56 is a ferro-magnetic piece fixed at the end of the glass plate 12 and confronts with said electro-magnet 54. The reference numeral 58 is a slit provided on the inner wall of the housing 50 so that said glass plate 12 can slide along the slit 58.

In operation, the glass plate 12 is pulled towards the bottom of the housing by the coil spring 52, and the first optical beam 10 generated by the semiconductor laser 10a is coupled with the output beam 11, through the focusing lens 5, the transparent portion of the glass plase 12, and the output port 7 having the lens. Next, when the electro-magnet 54 is energized by applying a direct current at the terminals 54c, said magnet 54 attracts the ferro-magnetic piece 56 together with the glass plate 12, then, the reflection film 13 on the glass plate 12 moves upwards, and prevents the first optical beam 10, instead, the second optical beam 9 generated by the semiconductor laser 9a is reflected by the film 13. Thus, the beam 9 is coupled with the output beam 11. Accordingly, the switching operation is performed by energizing or de-energizing the electro-magnet 54.

Figure 5:
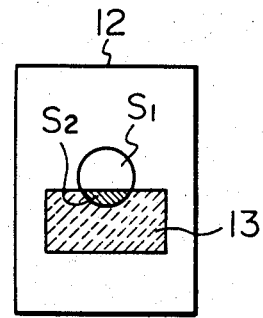
FIG. 5 shows the enlarged view of the present optical switch for the explanation of the operation of the present optical switch.

FIG. 5 shows the operation of the present optical switch. It is supposed that the ratio $S_1$ ($0 \leq S_1 \leq 1.0$) of the first input beam 9 passes the transparent portion of the glass plate 12, and the ratio $S_2$ ($0 \leq S_2 \leq 1.0$) of the second input beam 10 is reflected by the reflection film 13. It should be noted that the relations $S_1+S_2=1.0$ is satisfied. When the switch is in the first position $S_1=1.0$, and $S_2=0.0$ are satisfied, and when the switch is in the second position, $S_1=0.0$ and $S_2=1.0$ are satisfied. In the transient status between the first position and the second position of the switch, the values $S_1$ and $S_2$ change continuously holding the relationship $S_1+S_2=1.0$. Accordingly, it should be appreciated that no input energy is lost during the transient time as shown in FIG. 5.

Figure 6:
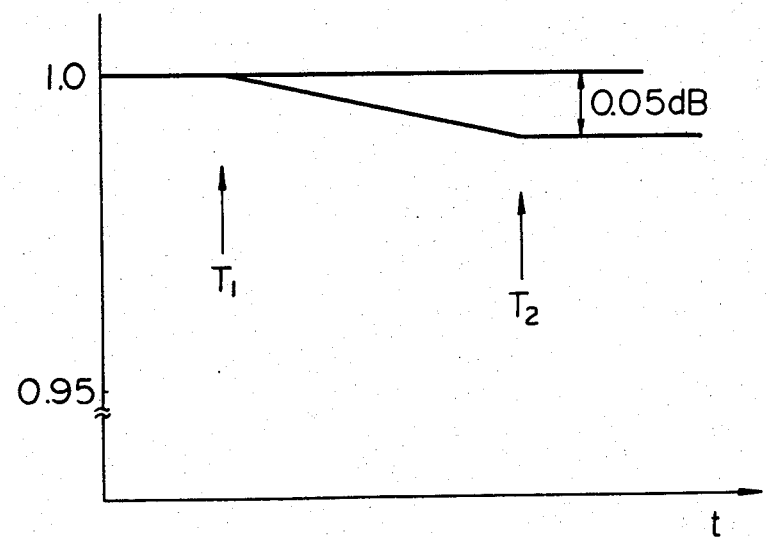
FIG. 6 shows the curve of the decrease of the output optical power during the switching transient in the present optical switch.

FIG. 6 shows the transient property of switching by the present optical switch, where the horizontal axis shows the time, and the vertical axis shows the level of the output beam 11. It is supposed in FIG. 6 that the reflection film 13 is made of silver and provides the reflection factor 98.9%, the input beam 10 is provided by the standby laser, and the input beam 9 is provided by the normal semiconductor laser (laser diode). Also, it is supposed that the level of both the input beams 9 and 10 is normalized to 1.0. The switching operation is initiated at the time $T_1$ and is finished at the time $T_2$, then, the duration between $T_1$ and $T_2$ is transient. As shown in FIG. 6, the level change of the output beam 11 is less than 0.05 dB during the whole transient.

It should be appreciated that the reflection film 13 in FIG. 5 is produced simply through either an evaporation process or a sputtering process, and the location, and the size (the length H and the width W) of the reflection film is determined according to the diameter of each beams and the length of the displacement of the glass plate during the switching. Therefore, it is quite clear that the present invention provides an optical switch which provides the less level change during the transient, and is easy to manufacture.

Figure 7A:
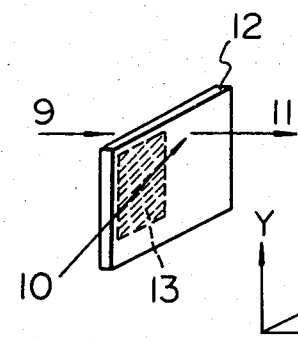
FIGS. 7A, 7B, 7C and 7D show another embodiment of the optical switch according to the present invention.
Figure 7B:
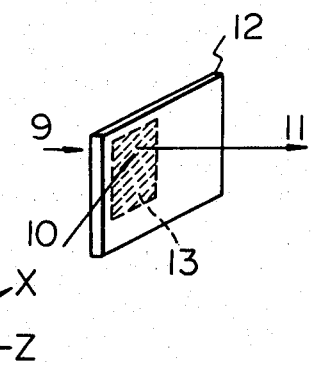
Figure 7C:
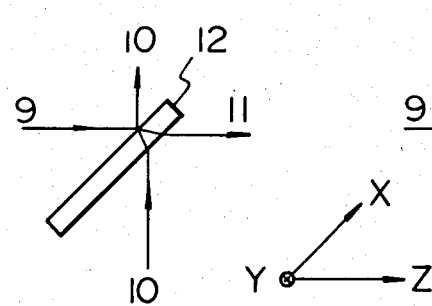
Figure 7D:
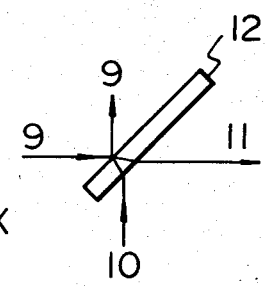

FIGS. 7A through 7D show another embodiment of the optical switch according to the present invention. The embodiment of those figures has also the glass plate 13 with a thin film for the non-reflection on the both surfaces of the same, and the reflection film 13 on one surface of the glass plate 12. The glass plate 12 is located similarly to the embodiment of FIGS. 4A through 4D in view of the input and output beams. The output beam 11 is coupled with either the first input beam 9 or the second input beam 10, according to the displacement of the glass plate 12, which displaces in the direction of the arrow X. Therefore, the feature of the embodiment of FIGS. 7A through 7D is the direction of the displacement of the glass plate 12, that is to say, the glass plate of FIGS. 7A through 7d moves in the direction X, while the glass plate of the embodiment of FIGS. 4A through 4D moves in the direction Y. FIGS. 7C and 7D show the operation in the XZ plane of the input beams 9 and 10 and the output beam 11.

Figure 8A:
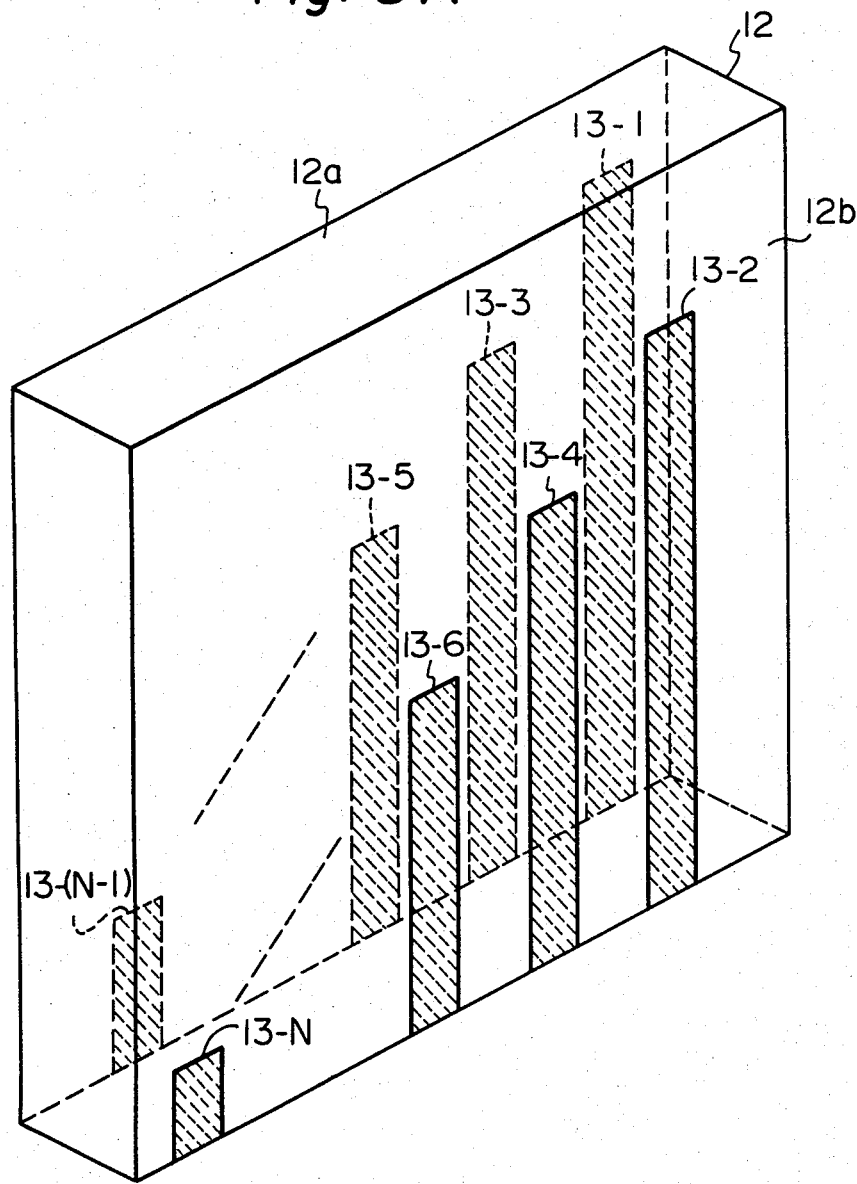

FIGS. 8A through 8D show still another embodiment of the optical switch according to the present invention. FIG. 8A shows the optical switch having the glass plate 12 with the thin films on both the surfaces of the same for the non-reflection purpose, and a plurality of reflection films 13-1 through 13-N, where N is an integer, in order to facilitate the sequential switching of (N+1) number of beams. FIG. 8B shows the arrangement of the reflection films on the surfaces 12-a and 12-b. The width W, the length D between each adjacent reflection films, and the height difference ΔH between the adjacent reflection films in FIG. 8B will be described later.

Figure 8C:
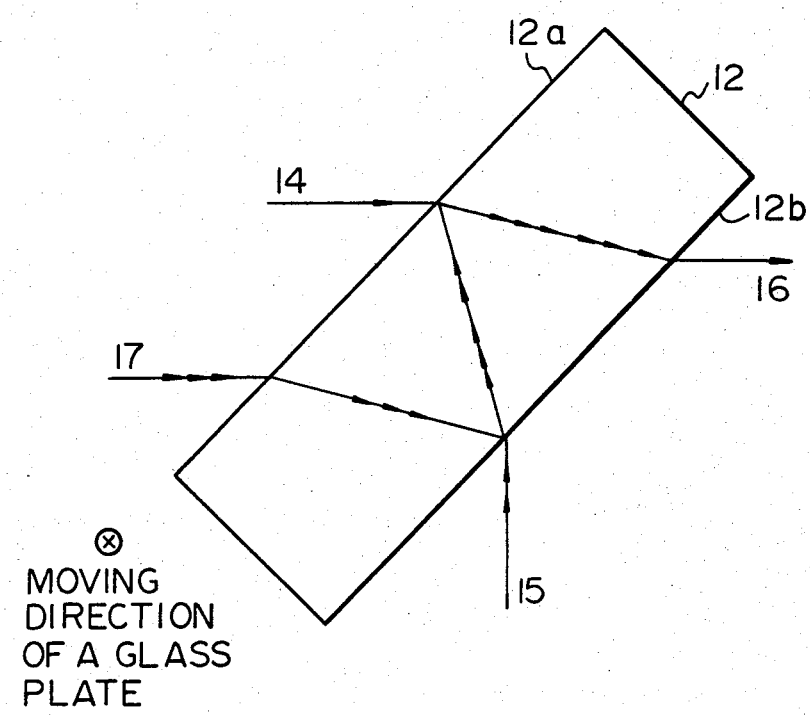

FIG. 8C shows the sequential switching of a plurality of input beams, where FIG. 8C shows the example that there are three input beams. The switching between the input beams 14 and 15 is accomplished in the same manner as that of FIGS. 4A through 4D, that is to say, the glass plate 12 displaces in the direction perpendicular to the plane defined by the input beams 14 and 15 with the angle between the glass plate 12 and the input beams 14 and 15 held to be 45 degrees. When the first reflection film 13-1 provided on the surface 12-a prevents the first input beam 14 and reflects the second input beam 15, the switching operation is finished. The switching between the second input beam 15 and the third input beam 17 is accomplished by another reflection film 13-2 provided on the surface 12-b. It should be appreciated in this case that the third input beam 17 is reflected twice by the reflection mirrors 13-1 and 13-2. Accordingly, a plurality of input beams are switched sequentially. The embodiment of FIGS. 8A through 8D does not suffer from the level change of the output beam during the transient as described in accordance with FIG. 5. Although some input beams are reflected more than twice in the embodiment of FIGS. 8A through 8D, the total reflection loss is still small enough, since the reflection factor of a silver film is more than 98.9%, and the switching loss in each reflection is less than 0.05 dB as described in accordance with FIG. 6, and the sum of the insertion loss of the reflection is still small enough. That small insertion loss or reflection loss is not a serious problem in switching a laser beam in a communication field.

The width W of each reflection film is determined by the diameter of input beams, the value ΔH is determined by the length of the displacement of the glass plate 12, and the duration D of FIG. 8B is determined by the location of the input beams and the thickness of the glass plate 12 (see FIG. 8C).

Figure 8D:
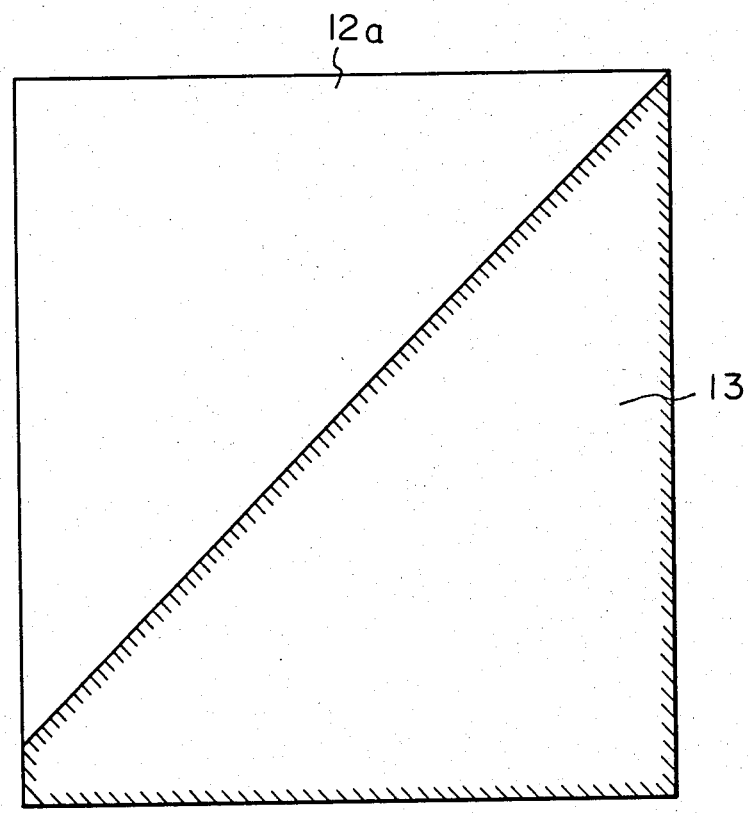

FIG. 8D which has the oblique border of the reflection film 13 is the alternative of the embodiment of FIG. 8C, and has the same effect as that of FIG. 8C.

Figure 9A:
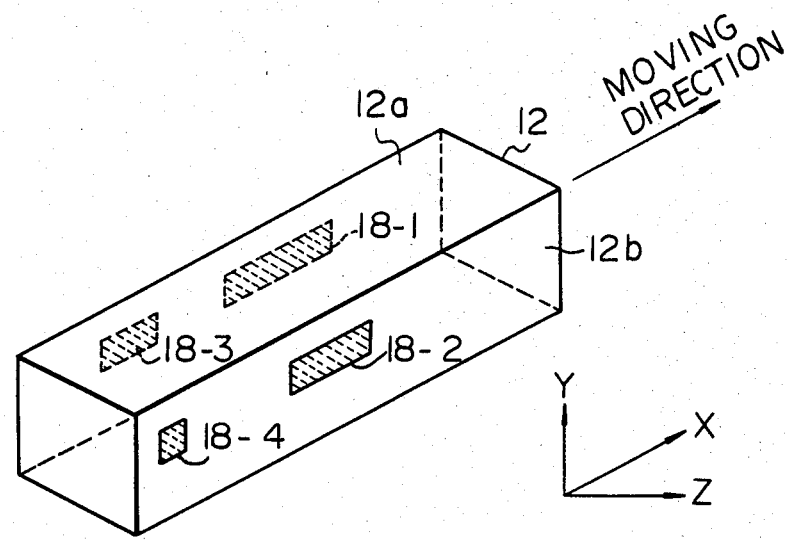
FIGS. 9A, 9B and 9C show still another embodiment of the optical switch according to the present invention.
Figure 9B:
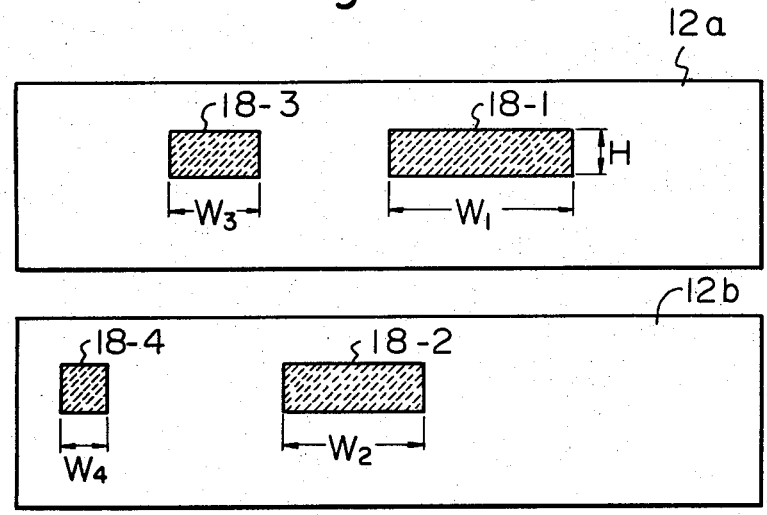
Figure 9C:
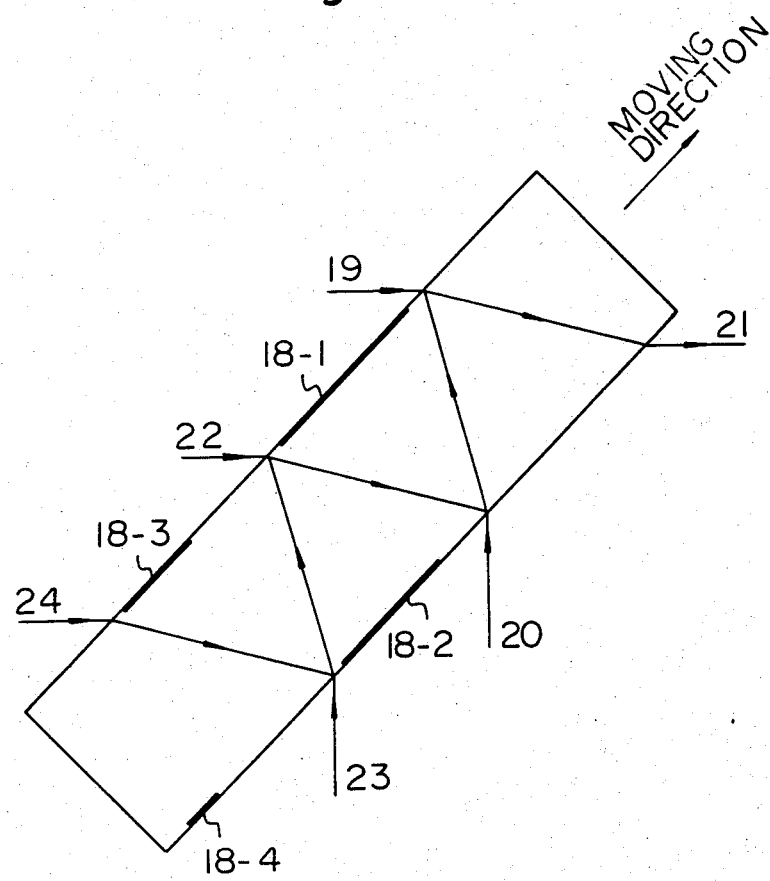

FIGS. 9A through 9C show still another embodiment of the optical switch according to the present invention. The embodiment of FIGS. 9A through 9C has the feature that more than two optical input beams can be switched. As shown in FIG. 9A, a plurality of reflection films are attached on both the surfaces 12-a and 12-b of the glass plate 12. Those reflection films are positioned staggerly. FIGS. 9A through 9C show the embodiment that there are a single normal input beam, and four standby input beams. FIG. 9B shows the embodiment of the location of the reflection films on the confronting surfaces 12-a and 12-b of the glass plate 12.

In the embodiment, the glass plate displaces in the direction X along the surfaces 12-a and 12-b as described in accordance with FIGS. 7A through 7D.

FIG. 9C shows the operation of the optical switching. The switching of the input beam from the beam 19 to the beam 20 is accomplished by the displacement of the reflection film 18-1, which prevents the first input beam 19 and reflects the second input beam 20, then, the second input beam 20 is coupled with the output beam 21. Then, when the glass plate is further displaced, the second input beam 20 is switched to the third input beam 22. In this situation, the second reflection film 18-2 prevents the second input beam 20 and reflects the third input beam 22, which is reflected by both the reflection films 18-2 and 18-1, and then, that third input beam 22 is coupled with the output beam 21. Similarly, the fourth, and the fifth input beams 23 and 24 can be switched, and are coupled with the output beam 21, by the proper displacement of the glass plate 12. The location of the reflection films 18-1 through 18-4, and the size (the height $H_i$ and width $W_i$) of each reflection film are determined according to the location and shape of the input beams, the thickness of the glass plate 12, and the length of the displacement of the glass plate 12. Although a plurality of input beams are reflected through a plurality of reflection mirrors, the insertion loss of the switch is still small, and arises no problem to the switching of lasers.

Figure 10A:
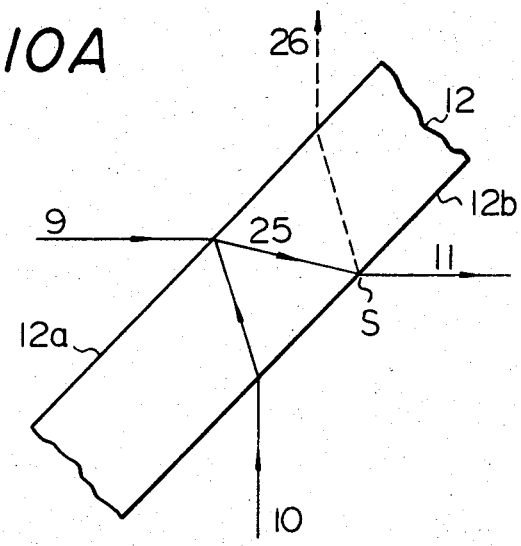
FIG. 10A shows the modification of the present optical switch.

FIG. 10A is still another embodiment of the optical switch according to the present invention. The feature of FIG. 10A is that some portions on the surface 12-*b* in FIG. 10A is not covered with non-reflection coating film. Either the input beam 9 or the input beam 10 is coupled with the beam 25, by either passing or being reflected by the reflection film on the surface 12-*a*. It is supposed that the area S which is illuminated by the beam 25, on the surface 12-*b* is not coated, and thus, some small ratio of the beam 25 is reflected by the surface 12-*b*, although almost all (more than 95%) of the beam 25 passes through the surface 12-*b*. The reflected beam 26 at the area S is shown by the dotted line 26 in FIG. 10A.

Figure 10B:
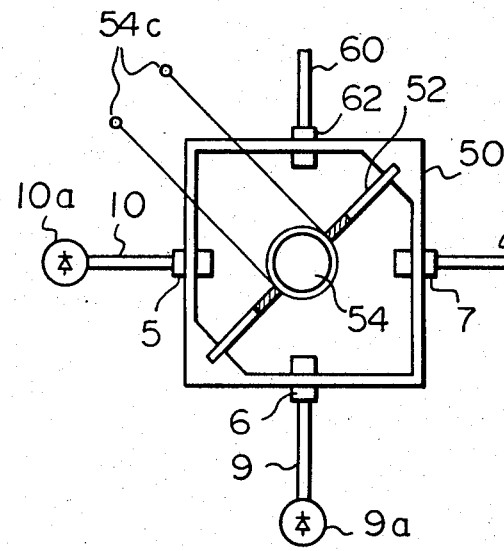
FIG. 10B is the mechanical structure of the optical switch of FIG. 10A.

FIG. 10B shows the mechanical structure of the optical switch for the embodiment of FIG. 10A. The structure of FIG. 10B is the same as that of FIGS. 4E and 4F, except for the presence of the monitor optical fiber 60 coupled with the output port 62 which is fixed to the housing 50. Said monitor optical fiber 60 conducts the beam 26 of FIG. 10A.

That reflected beam 26 may be used as a reference beam in an automatic power control (APC) for controlling the output of a laser, or a monitoring beam for locating the failure or trouble in the optical cable. When that reflected beam 26 is used as a monitoring beam, the number of optical components in an optical repeater can be reduced considerably.

Figure 11A:
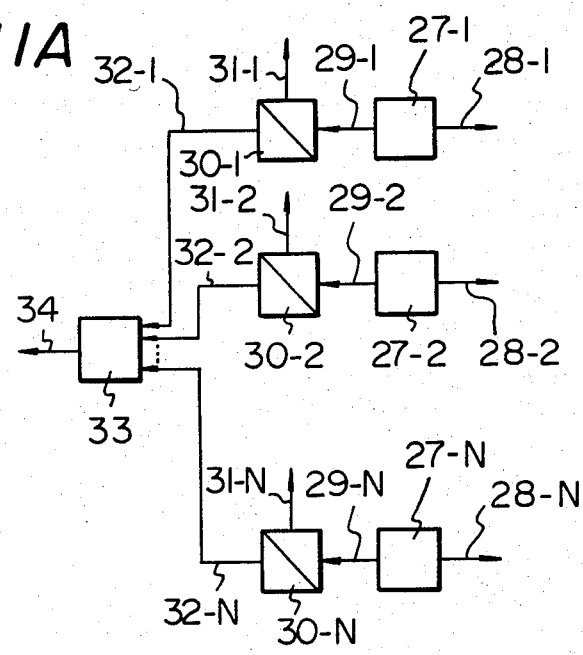
FIG. 11A is the block diagram of the main portion of a prior optical repeater for the explanation of the modification of FIGS. 10A and 10B, and FIGS. 11B and 11C show the mechanical structure of the optical switch of FIG. 11A.

FIG. 11A shows the light output part of an optical repeater, in which the (N-1) number of standby lasers are provided, and the back beam of each laser is utilized as a reference beam for APC and a monitoring beam for the failure location. In the figure, the reference numeral 27-1 is a normal laser, 27-2 through 27-N are the (N-1) number of standby lasers. The front-beams 28-1 through 28-N are transmitted alternately through the switching. At this time, the back beams 29-1 through 29-N which are applied to the optical dividers 30-1 through 30-N, respectively, are used as the reference beams 31-1 through 31-N, respectively, which control the output power of the laser system. Further, other output beams 32-1 through 32-N of the optical dividers 30-1 through 30-N are used as a monitoring beam 34 through the selection by the optical coupler or the switch 33. In the figure of FIG. 11A, the N number of optical dividers and an optical coupler or switch 33 are necessary. However, when the reflected beam 26 of FIG. 10A is utilized as a monitoring beam, those optical components are not necessary. The increase of the loss by not providing a non-reflection film is less than 0.2 dB.

Figure 11B:
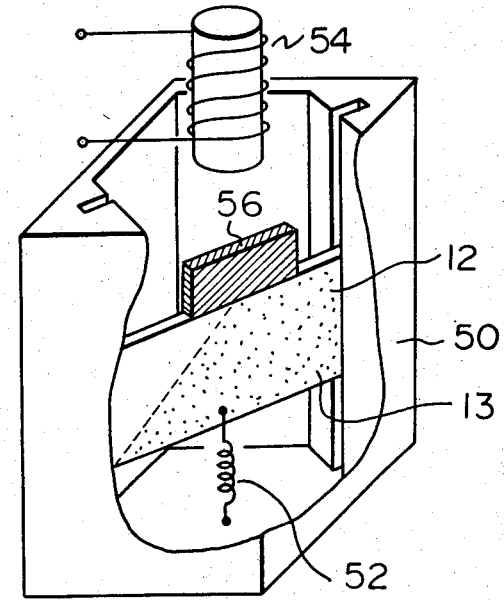
Figure 11C:
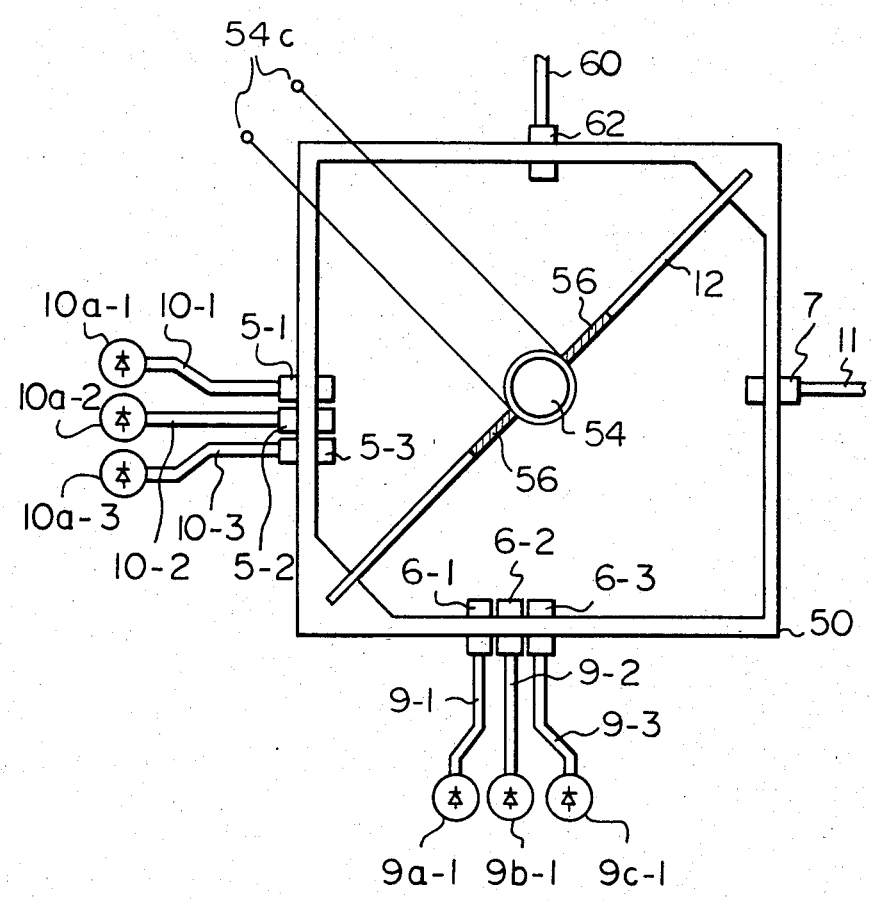

FIGS. 11B and 11C show the mechanical structure of the optical switch for the use of the embodiment of FIG. 11A. In FIGS. 11B and 11C, the reflection film 13 has the structure of FIG. 8D which has the oblique border. The glass plate 12 in FIGS. 11B and 11C can locate at a plurality of positions by adjusting the current in the coil of the magnet 54. The embodiment of FIGS. 11B and 11C has six input lasers 9*a*-1, 9*a*-2, 9*a*-3, 10*a*-1, 10*a*-2 and 10*a*-3, one of those lasers is used as a normal optical source, and other five lasers are standby.

As described above in detail, according to the present invention, an optical switch which provides less decrease of the output level during the switching transient is provided. Further, the insertion loss of an optical switch is small even when the number of branches of the switch is increased. Further, the present optical switch can be manufactured easily since the structure is simple. Thus, the application for the industry of the present optical switch is expected.

Form the foregoing it will now be apparent that a new and improved optical switch has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical switch comprising:
    a transparent plate having a pair of parallel planes,
    a reflection film provided on both of said parallel planes,
    a first input means for providing a first input beam to a first plane of said transparent plate, wherein the angle between the first beam and the first plate is 45°,
    a second input means for providing a second input means to the first plane of said transparent plate through a second plane of said transparent plate, wherein the angle between the second beam and the second plane is 45°,
    output means for providing an output beam by receiving one of the input beams through said transparent plate,
    said input beams and output beam residing in the plane perpendicular to the transparent plate,
    said second input means being provided so that the angle between the first and the second input beams is 90°, and the second input beam illuminates the same spot of the first plane as the first input beam does,
    said output means being provided so that the first input beam is coupled with the output means through the transparent plate, and the second input beam is coupled with the output means through the reflection by the reflection film,
    means for displacing said transparent plate together with the reflection film in the plane defined by said transparent plate, and
    a housing for securing the above components.

2. An optical switch according to claim 1, wherein a non-reflection coating film is provided on the surfaces of the transparent plate.

3. An optical switch according to claim 2 including a window on a portion of the surface where said non-reflection coating film is not provided.

4. An optical switch according to claim 1, wherein reflection films on one surface of the transparent film are staggered with respect to other reflection films on the other surface of the transparent film.

5. An optical switch according to claim 1, wherein said means for displacing the transparent plate together with the reflection film has an electro-magnet fixed to the housing, a ferro-magnetic piece fixed to said transparent plate such that it is pulled by said magnet, and a coil spring for pulling the transparent plate against said magnet.

6. An optical switch comprising:
    a transparent plate having a pair of parallel planes, a plurality of reflection films provided on each of said parallel planes, a first input means for providing a first input beam to a first plane of said transparent plate, wherein the angle between the first beam and the first plate is 45°, a second input means for providing a second input beam to the first plane of said transparent plate through a second plane of said transparent plate, wherein the angle between the second beam and the second plane is 45°, output means for providing an output beam by receiving one of the input beams through said transparent plate, said input beams and output beam residing in the plane perpendicular to the transparent plate, said second input means being provided so that the angle between the first and the second input beams is 90°, and the second input beam illuminates the same spot of the first plane as the first input beam does, said output means being provided so that the first input beam is coupled with the output means through the transparent plate, and the second input beam is coupled with the output means through the reflection by the reflection film, means for displacing said transparent plate together with the reflection film in the plane defined by said transparent plate, and a housing for securing the above components.

7. An optical switch comprising:

a transparent plate having a pair of parallel planes, a reflection film attached on at least one of said parallel planes, a first input means for providing a first input beam to a first plane of said transparent plate, wherein the angle between the first beam and the first plate is 45°, a second input means for providing a second input beam to the first plane of said transparent plate through a second plane of said transparent plate, wherein the angle between the second beam and the second plane is 45°, a third input means for providing a third input beam to said first plane of said transparent plate, wherein said first and third input beams are incident on different points of said first plane, output means for providing an output beam by receiving one of the input beams through said transparent plate, said input beams and output beam residing in the plane perpendicular to the transparent plate, said second input means being provided so that the angle between the first and the second input beams is 90°, and the second input beam illuminates the same spot of the first plane as the first input beam does, said output means being provided so that the first input beam is coupled with the output means through the transparent plate, and the second input beam is coupled with the output means through the reflection by the reflection film, means for displacing said transparent plate together with the reflection film in the plane defined by said transparent plate, and a housing for securing the above components.

* * * * *